April 4, 1939.    A. G. KERSHAW ET AL    2,152,806
AUTOMATIC SLACK ADJUSTER
Filed Jan. 10, 1939    2 Sheets-Sheet 1

INVENTORS
ARTHUR G. KERSHAW
KENNETH H. LEECH
BY
ATTORNEY

April 4, 1939.  A. G. KERSHAW ET AL  2,152,806
AUTOMATIC SLACK ADJUSTER
Filed Jan. 10, 1939   2 Sheets-Sheet 2

INVENTORS
ARTHUR G. KERSHAW
KENNETH H. LEECH
BY
ATTORNEY

Patented Apr. 4, 1939

2,152,806

UNITED STATES PATENT OFFICE 2,152,806

AUTOMATIC SLACK ADJUSTER

Arthur G. Kershaw and Kenneth H. Leech, London, England, assignors to Westinghouse Brake & Signal Company, Limited, London, England Application January 10, 1939, Serial No. 250,122
In Great Britain December 18, 1937

6 Claims. (Cl. 188—202)

This invention relates to automatic slack adjusting devices for braking apparatus of the well known kind in which the slack in the brake rigging is arranged to be adjusted automatically, so as to maintain the slack substantially constant under all conditions, by means of screw and nut mechanism adapted to be operated during a stage of movement of the brake rigging through the intermediary of a suitable uni-directional clutch device by an operating arm adapted to be moved relatively to the slack adjusting device during the movement of the brake rigging.

In order to enable a slack adjusting device of this general kind to be reset after the maximum automatic adjustment permitted by the screw and nut mechanism has been effected, manually operable arrangements are provided for disengaging the uni-directional clutch device so as to permit the manual adjustment of the screw and nut mechanism in the reverse direction to that effected automatically, and one of the objects of the present invention is to provide improved manually operable resetting arrangements of this general character.

In accordance with one feature of the invention, a portion of one of the elements of the screw and nut mechanism is adapted for the reception of a tool whereby it may be rotated in order to reset the slack adjusting device, this tool receiving portion being normally shielded by a member adapted to be displaced against the action of a spring or its equivalent by the application of the tool to the tool receiving portion and so co-operate with the uni-directional clutch device as to disengage such device.

The invention is also concerned with the mounting of the slack adjusting device in such a way as to permit the transmission of a braking effort therethrough to the braking element or elements from either or both of two brake operating devices, and with this end in view, in accordance with another feature of the invention the braking effort is arranged to be transmitted to the slack adjusting device through the intermediary of a bell-crank lever, one arm of which is arranged to be connected to the slack adjusting device, the other arms each being connected through a suitable lost motion device to one of the two brake operating devices.

The operating arm of the uni-directional clutch device is coupled by means of a link to a fixed point so that movement of the slack adjusting device during the movement of the brake rigging will correspondingly move the operating arm in the well known manner and in order to prevent damage to the slack adjusting device or its associated members from occurring in the event of failure to reset the slack adjusting device when required, and in the event of further wear of the braking elements occurring, the link is in accordance with a further feature of the invention constructed so as to be resiliently both extensible and contractible.

In order that the invention may be readily understood, it will now be described by way of example with reference to the accompanying drawings in which.

Figure 2:
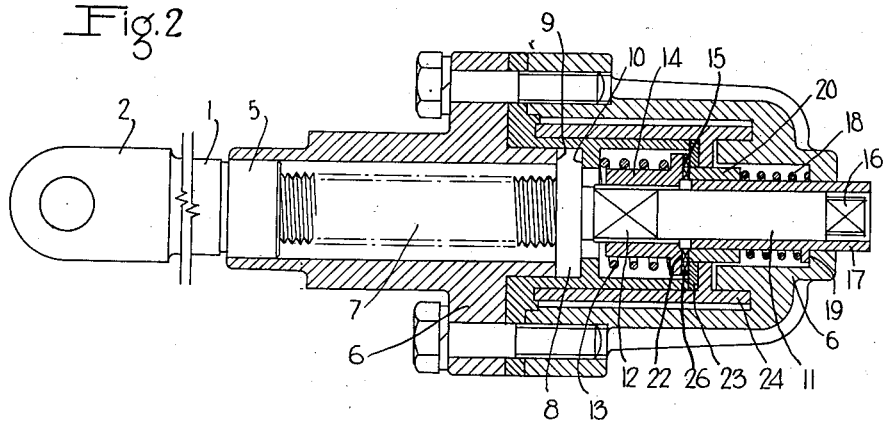
Fig. 2 is a view of the slack adjusting device mainly in section in a vertical plane through the longitudinal axis of the device.
Figure 3:
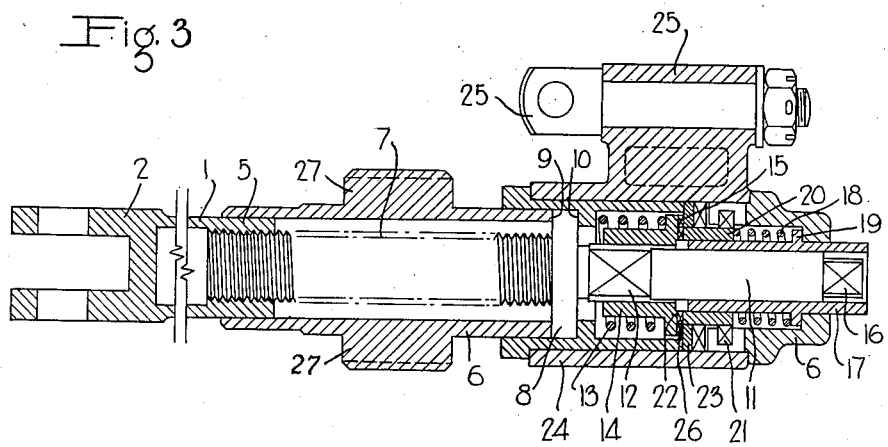
Fig. 3 is a sectional view in a plane through the longitudinal axis of the device but at right angles to the plane of Fig. 2.

In this example of the invention the slack adjusting device comprises a hollow tubular member 1 having an eye portion 2 at its left hand end (Figs. 2 and 3) adapted to be coupled to a relatively short arm 3 on a cam shaft 4 (Fig. 1) of a suitable brake actuating means (not shown in the drawings) and an internally screw-threaded portion 5 at its other end which, when the device is set in condition for taking up slack, extends a relatively short distance within the hollow interior of the body 6 of the device. Located within the hollow interior of the body 6 is an externally screw-threaded rod 7 co-operating at its left hand end (Figs. 2 and 3) with the internally screw-threaded right hand end 5 of the hollow tubular member 1.

The screw-threaded rod 7 is mounted within the body 6 so as to be capable of rotation around its own axis but is prevented from longitudinal movement within the body 6 by an annular flange portion 8 of the rod at the right hand end thereof which extends between a pair of internal annular shoulders 9 and 10 in the body of the device. The screw-threaded rod 7 is provided with an extension 11 at its right hand end beyond the annular flange 8, this extension being of square cross section for a short length 12 near the annular flange 8.

Mounted upon this squared portion 12 of the rod so as to be capable of limited longitudinal movement towards the left against the action of a spring 13 is an annular uni-directional clutch member 14 having radially extending inclined ratchet teeth on its enlarged right hand end 15.

The extreme right hand end 16 of the extension 11 of the screw-threaded rod 7 is squared and projects from the body 6 of the device. Normally, however, this squared end 16 is shielded or covered laterally by a tubular clutch disengaging member 17 mounted on the extension 11 of the rod 7 and extending within the body 6 of the slack adjusting device. This tubular clutch disengaging member 17 is normally held in its right hand position, in which the clutch device is engaged and the squared end 16 of the extension 11 shielded or covered, by means of a spring 18 located between an external flange 19 on the clutch disengaging member 17 and an annular clutch member 20 mounted on the clutch disengaging member 17 so as to be capable of limited longitudinal movement relatively thereto but prevented from rotating by dogs 21 provided on the member 20 and engaging in slots in the body 6. This annular clutch member 20 (hereinafter termed the locking clutch member) is provided at its left hand end 22 with radially extending inclined ratchet teeth co-operating with the inner portions of the ratchet teeth on the annular clutch member 14 (hereinafter termed the driven clutch member) mounted on the squared portion 12 of the extension 11 of the rod 7.

A further annular clutch member 23 is carried internally by a sleeve 24 mounted on the body 6 of the slack adjusting device so as to be capable of rotation around the axis of the body, but prevented from longitudinal displacement with respect to the body. This sleeve 24 is provided with a lug constituting the operating arm 25 of the slack adjusting device and the annular clutch member 23 carried by this sleeve 24 (hereinafter termed the driving clutch member) is provided at its left hand end 26 with radially extending inclined ratchet teeth engaging with the outer portions of the ratchet teeth on the driven clutch member 14.

The operating arm 25 is provided with a rockable pin 25′ to which one end of a link 30 is connected by a pin 55, the other end of said link being pivotally connected to a lug 28 on a fixed bracket member 29 by a pin 57. The end of the link 30 is provided with a slot 56 through which the pin 57 extends for providing a limited lost motion between said link and the lug 28.

In operation, when a pull (towards the right in Figs. 2 and 3 or towards the left in Fig. 1) is exerted on the slack adjusting device by movement of the brake rigging (not shown) coupled to lugs 27 provided on the body 6 of the device, this pull is transmitted through the screw-threaded rod 7 and tubular member 5 secured to the arm 3 of the cam shaft 4 and thus rocks said arm to take up the slack in the brake rigging and apply the brakes. To effect a release of the brakes, the pull on the lugs 27 and thereby on the arm 3 of the cam shaft 4 is removed which permits said arm to return to its normal position.

In effecting an application of the brakes as just described, the slack adjusting device is moved bodily (towards the right in Figs. 2 and 3 or left in Fig. 1) and the operating arm 25 is operated by the link 30 to rotate the sleeve 24 in such a direction that the teeth on the driving clutch member 23 slip over the inclined teeth on the driven clutch member 14, the locking clutch member 20 positively preventing the driven clutch member 14 from being rotated.

In case, in effecting an application of the brakes, the slack in the brake rigging is insufficient to permit the teeth on the driving clutch member 23 to rotate relative to the driven clutch member 14 an amount corresponding to the distance between adjacent teeth thereon, then upon effecting a release of the brakes, the rotation of the driving clutch member back to its initial position by the arm 25 is merely relative to the driven clutch member 14, so that the driven clutch member is not affected in any way. However, in the event of the slack in the rigging exceeding a predetermined amount the driving clutch member 23 will be rotated with respect to the driven clutch member 14 by an amount slightly exceeding the distance between adjacent ratchet teeth and when the brakes are being released and the operating arm 25 is returned to its original position, the driving clutch member 23 will rotate the driven clutch member 14 by an amount corresponding to the distance between two adjacent ratchet teeth. The rotation of the driven clutch member 14 is transmitted to the screw-threaded rod 7 and the rotation of the latter will decrease the extent of movement of the arm 3 on the cam shaft 4 and thus reduce the slack in the rigging by a corresponding amount. As wear of the braking elements occurs progressively, the slack adjusting device operates progressively to take up more and more slack, while the tubular member 1 gradually enters the body 6 of the slack adjusting device until eventually the internally screw-threaded end 5 of this tubular portion 1 arrives at or near the inner end of the screw-threaded rod 7 and no further automatic adjustment is possible until the device is reset.

In order to reset the device a tool such as a key or spanner (not shown) is applied to the squared end 16 of the extension 11 of the screw-threaded rod 7. Normally this end of the extension is shielded or covered by the clutch disengaging member 17 but upon the application of the tool this clutch disengaging member is moved towards the left (Figs. 2 and 3) into the body 6 of the slack adjusting device against the action of the spring 18 associated with this member and the locking clutch member 20. This movement of the clutch disengaging member 17 towards the left causes the left hand end of the member to engage with the driven clutch member 14 and move it out of engagement with the driving and locking clutch members 23 and 20 against the action of the spring 13, the dogs 21 abutting against the left hand ends of the slots in the body 6. Thus the rotation of the screw-threaded rod 7 can be effected in the direction to reset the slack adjusting device and immediately the tool is removed the clutch members are automatically re-engaged by the action of the springs 13 and 18. Moreover, the tool if left inadvertently on the square end 16 of the extension of the rod, would be removed by the action of the springs, so that the possibility of the clutch device being left inoperative inadvertently is eliminated.

Figure 1:
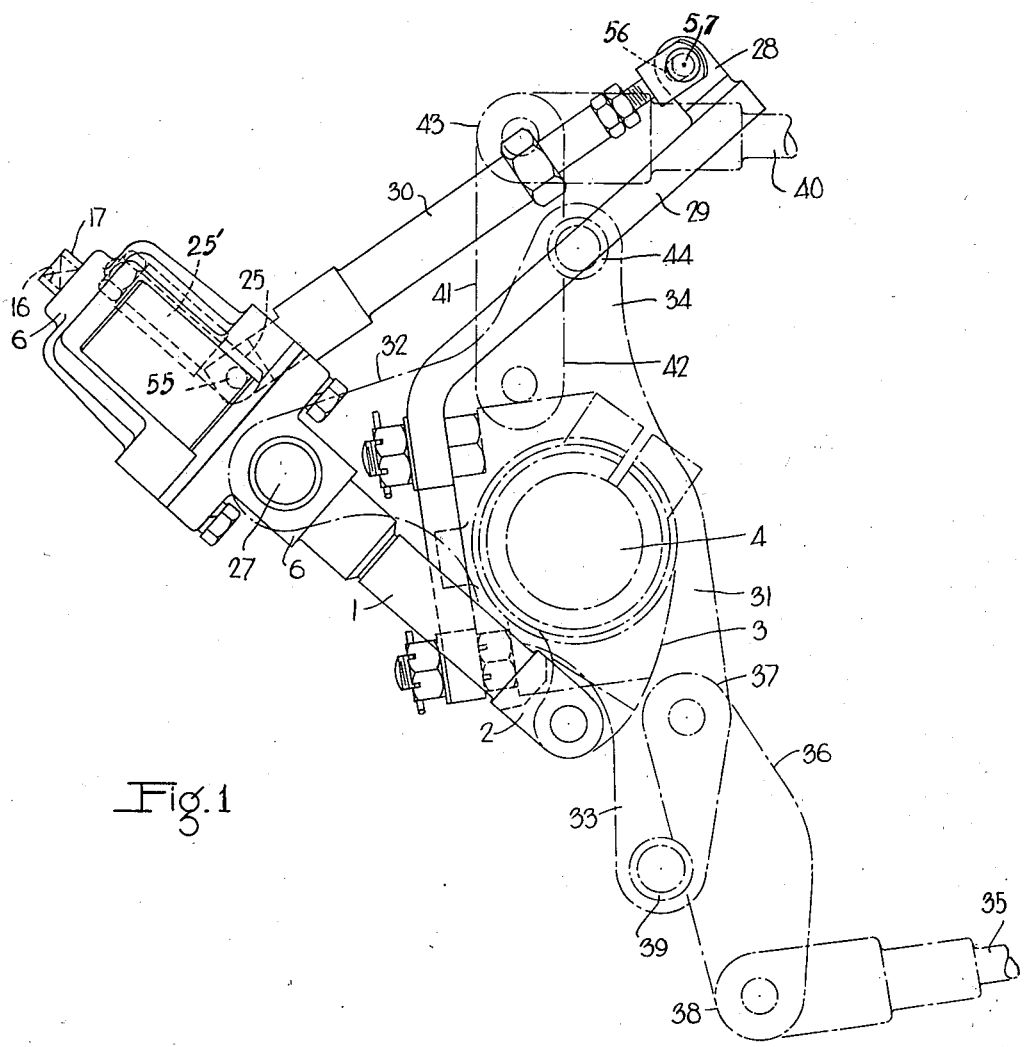
Fig. 1 is a side view of the slack adjusting device as applied to a road vehicle braking system adapted to be operated both manually and by fluid pressure.

As shown in Fig. 1 the braking effect is arranged to be transmitted to the arm 3 of the cam shaft 4 through a bell-crank lever 31 one arm 32 of which is coupled to the body 6 of the slack adjusting device at 27, the other two arms 33 and 34 each being coupled through lost motion devices and suitable rigging to one of two brake operating devices.

For example, the bell crank lever 31 may be rotated in the brake applying direction by a pull exerted by a hand brake lever or by a thrust exerted by a fluid pressure cylinder. In this case, the piston of the cylinder, not shown in the drawings, is coupled to the arm 33 of the bell-crank lever 31 through a push rod 35 an intermediate lever 36 pivotally mounted at one end 37 on the arm 33, this intermediate lever 36 being pivotally connected at its other end 38 to the push rod 35 and adapted to engage at an intermediate point therein on its left hand side with a stop 39 on the arm 33 of the bell-crank lever 31 so as to transmit a forward thrust of the piston to the bell crank lever to apply the brakes. Similarly the hand brake lever in this case is coupled to the arm 34 of the bell-crank lever 31 through a pull rod 40 and another intermediate lever 41 pivotally mounted at one end 42 on the arm 34 of the bell-crank lever, this intermediate lever 41 being pivotally connected at its other end 43 to the pull rod 40 and adapted to engage at an intermediate point therein on its right hand side with a stop 44 on the arm 34 of the bell-crank lever 31 so as to transmit a rearward pull on the hand lever to the bell crank lever to apply the brakes. This arrangement as will be evident enables a pull on the hand lever or a thrust by the fluid pressure piston to be transmitted through the slack adjusting device to the braking elements alternatively or simultaneously.

Figure 4:
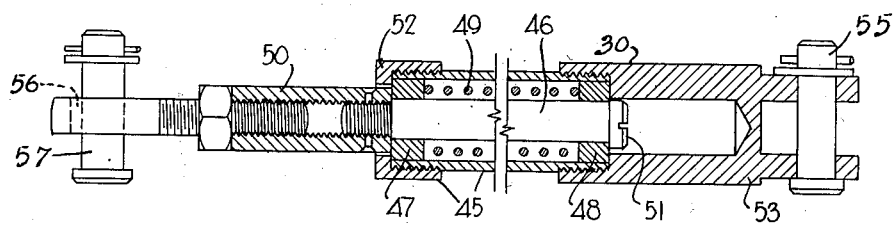
Fig. 4 is a sectional view of a detail associated with the device as shown in Fig. 1.

The link 30 referred to herebefore which serves to anchor the operating arm 25 of the slack adjusting device to a fixed point may be made both extensible and contractible in order to prevent damage to the slack adjusting device in the event of the slack adjusting device not being reset when required and further wear of the braking elements, occurring. With this end in view the link may comprise as shown in Fig. 4, a hollow body portion 45 and a rod member 46 extending within this body portion and supported so as to be capable of sliding in bearing members 47 and 48 arranged to be capable of longitudinal movement within the body portion, these bearing members being normally maintained in their extreme outward positions, as shown in Fig. 4, by means of a spring 49 interposed between them and surrounding the rod 46. In these positions the bearing members 47 and 48 abut respectively against a nut member 52 carried by the body 45 and a member 53 whereby the link is connected to the operating arm of the slack adjuster. In the event of a thrust of a predetermined value corresponding to the strength of the spring 49 being exerted on the link 30 due to the operating arm 25 of the slack adjuster being locked in position, the rod 46 will move inwardly against the action of the spring 49, a coupling member 50 whereby the rod 46 is connected to lug 28 on the fixed bracket 29 being arranged normally to abut against the outer bearing member 47. On the other hand in the event of a pull of predetermined value corresponding to the strength of the spring 49 being exerted on the link due to the operating arm being locked in position, the rod 46 will move outwardly against the action of the spring, a stop member 51 being provided at the inner end of the rod 46 which normally abuts against the inner bearing member 48.

It will be evident that the invention is not limited to the particular construction and arrangement of the parts hereinbefore described which may be varied as desired to suit particular requirements without exceeding the scope of the invention.

Having now described our invention, what we claim as new and desire to secure by Letters Patent, is:

1. An automatic slack adjuster device for controlling the slack in a brake rigging comprising a rotatable screw, a nut having screw-threaded engagement with said screw and operative upon rotation of said screw in one direction to reduce the slack in said rigging, ratchet means controlled by the slack in said brake rigging and automatically operative upon a chosen increase in said slack to rotate said screw to reduce said slack, reset means associated with said screw adapted to be operated by a removable, manually operative tool for turning said screw in the reverse direction, and means operable upon application of said tool to said reset means to release said ratchet means and upon removal of said tool from said reset means to automatically render said ratchet means effective.

2. An automatic slack adjuster device for controlling the slack in a brake rigging comprising a casing, a rotatable screw in said casing fixed against longitudinal movement relative to said casing, a nut having screw-threaded engagement with said screw and operative upon rotation of said screw in one direction to reduce the slack in said rigging, ratchet means in said casing operative to rotate said screw in said one direction, means controlled by the slack in said rigging and operative upon a chosen increase in said slack to effect operation of said ratchet means to reduce said slack, one end of said screw being formed to receive the end of a removable, manually operated tool for turning said screw in the reverse direction, and means operable upon application of said tool to said one end of said screw to release said ratchet means and operative upon removal of said tool from said screw to automatically render said ratchet means effective.

3. An automatic slack adjuster device for controlling the slack in a brake rigging comprising a casing, a rotatable screw in said casing fixed against longitudinal movement relative to said casing, a nut having screw-threaded engagement with said screw and operative upon rotation of said screw in one direction to reduce the slack in said rigging, ratchet means in said casing operative to rotate said screw in said one direction, means controlled by the slack in said rigging and operative upon a chosen increase in said slack to effect operation of said ratchet means to reduce said slack, one end of said screw being so formed as to receive a removable, manually operative tool for turning said screw in the reverse direction, means so disposed as to be operated by said tool during application thereof to said one end of said screw for releasing said ratchet means, and means for automatically operating the ratchet releasing means to render said ratchet means effective upon removal of said tool from said screw.

4. An automatic slack adjuster device for controlling the slack in a brake rigging comprising a casing, a rotatable screw in said casing fixed against longitudinal movement relative to said casing, a nut having screw-threaded engagement with said screw and operative upon rotation of said screw in one direction to reduce the slack in said rigging, ratchet means in said casing operative to rotate said screw in said one direction, means controlled by the slack in said rigging and operative upon a chosen increase in said slack to effect operation of said ratchet means to reduce said slack, one end of said screw being so formed as to receive a removable, manually operative tool for turning said screw in the reverse direction, a shield associated with said ratchet means slidably mounted on a portion of said screw and covering said one end of said screw, said shield being operative upon movement in the direction to uncover said one end of said screw to render said ratchet means ineffective and upon movement in the reverse direction to render said ratchet means effective, and spring means for urging said shield in the direction to render said ratchet means effective, application of said tool to said one end of said screw being adapted to move said shield in the direction to render said ratchet means ineffective.

5. An automatic slack adjuster device for controlling the slack in a brake rigging comprising a casing, a rotatable screw in said casing fixed against longitudinal movement relative to said casing, a nut having screw-threaded engagement with said screw and operative upon rotation of said screw in one direction to reduce the slack in said rigging, ratchet means in said casing comprising a driven member operative to rotate said screw in said one direction, a driving member for operating said driven member, and a locking member cooperative with said driven member to hold said screw against rotation in the reverse direction, means controlled by the slack in said brake rigging and operative upon a chosen increase in said slack to operate said driving member for operating said driven member to reduce said slack, resilient means urging said driven, driving and locking members into cooperative relation, reset means associated with said screw adapted to be operated by a removable, manually operated tool for turning said screw in the reverse direction, and means operable upon application of said tool to said reset means to disengage said driven member from said driving and locking members, said resilient means being operative to reengage said driven member with said driving and locking members upon removal of said tool from said reset means.

6. An automatic slack adjuster device for controlling the slack in a brake rigging comprising a casing, a screw journaled in said casing and secured against longitudinal movement relative to said casing, a nut having screw-threaded engagement with said screw and operative upon rotation of said screw in one direction to reduce the slack in said brake rigging, said screw having an axial extension, a clutch device encircling said extension and comprising a driven clutch member splined to said extension, a driving clutch member journaled on said casing and adapted to cooperate with said driven member to operate said screw in the direction to take up slack, said clutch device further comprising a locking member adapted to cooperate with said driven member for holding same against rotation in the reverse direction, a spring acting on said driven member for urging it into cooperative relation with said driving and locking members, a sleeve like element slidably mounted on said extension normally covering the end portion thereof and adapted to be displaced in a direction to uncover said end portion and to disengage said driven member from said driving and locking members, said end of said extension being adapted to receive a manually operative tool for turning said screw in said reverse direction, said displacement of said sleeve like element being adapted to be effected upon application of said tool to said end of said extension.

ARTHUR G. KERSHAW.
KENNETH H. LEECH.